April 6, 1926.
F. D. CHAPMAN
1,579,517
AUTOMATIC PROCESSING APPARATUS
Filed August 3, 1923    4 Sheets-Sheet 4
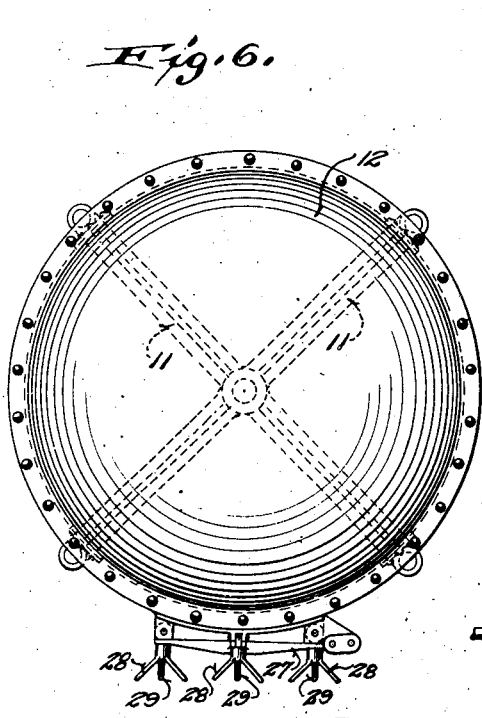
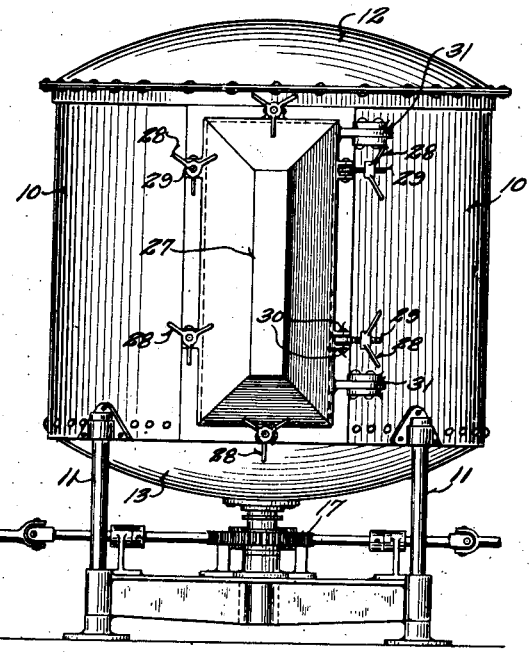
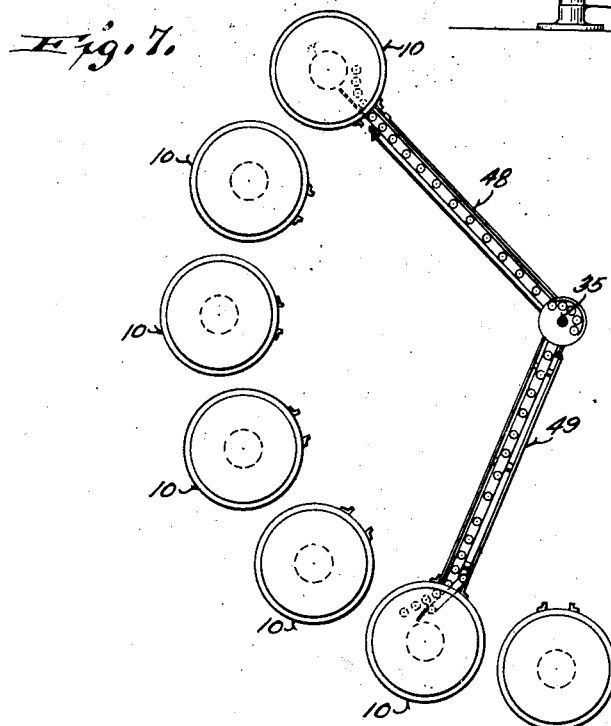
INVENTOR.
Frank D. Chapman
BY Morsell, Keeney + Morsell,
ATTORNEYS.

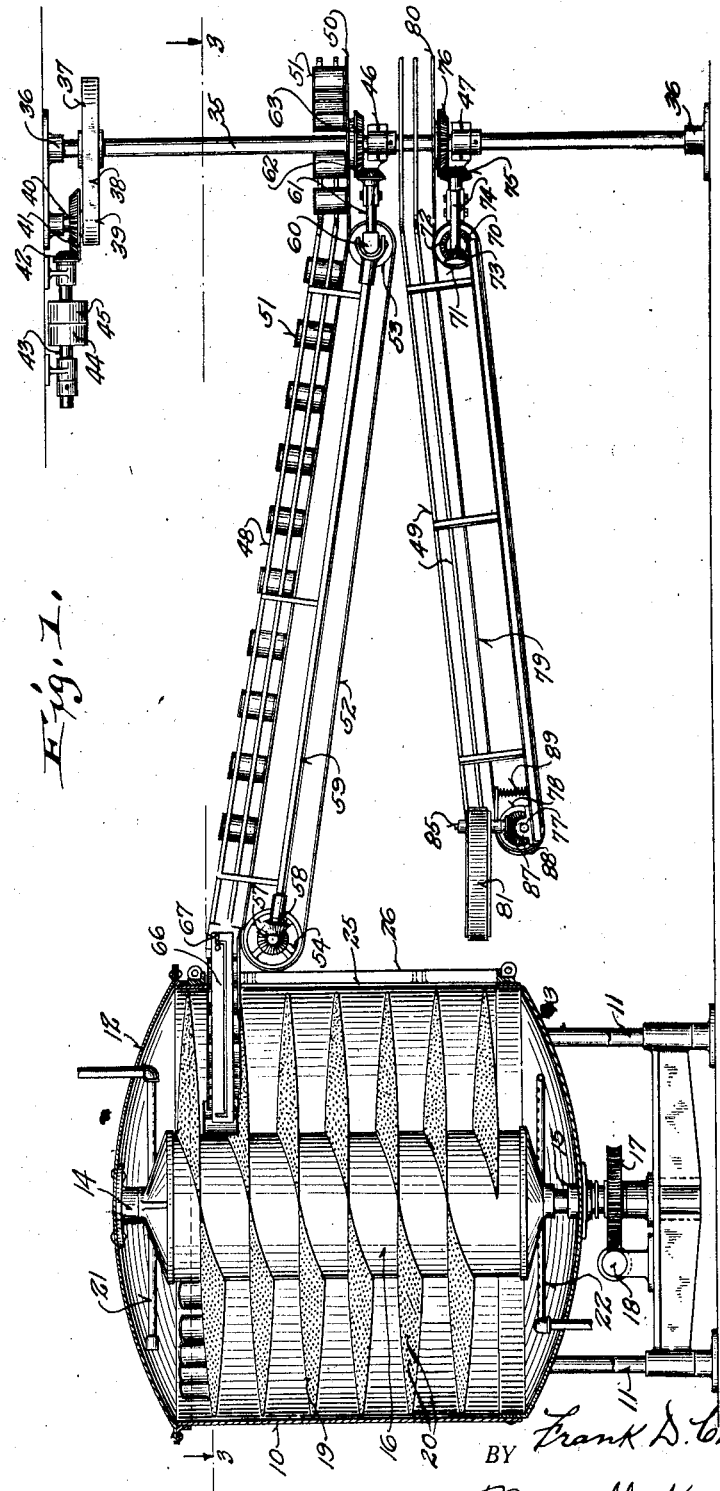

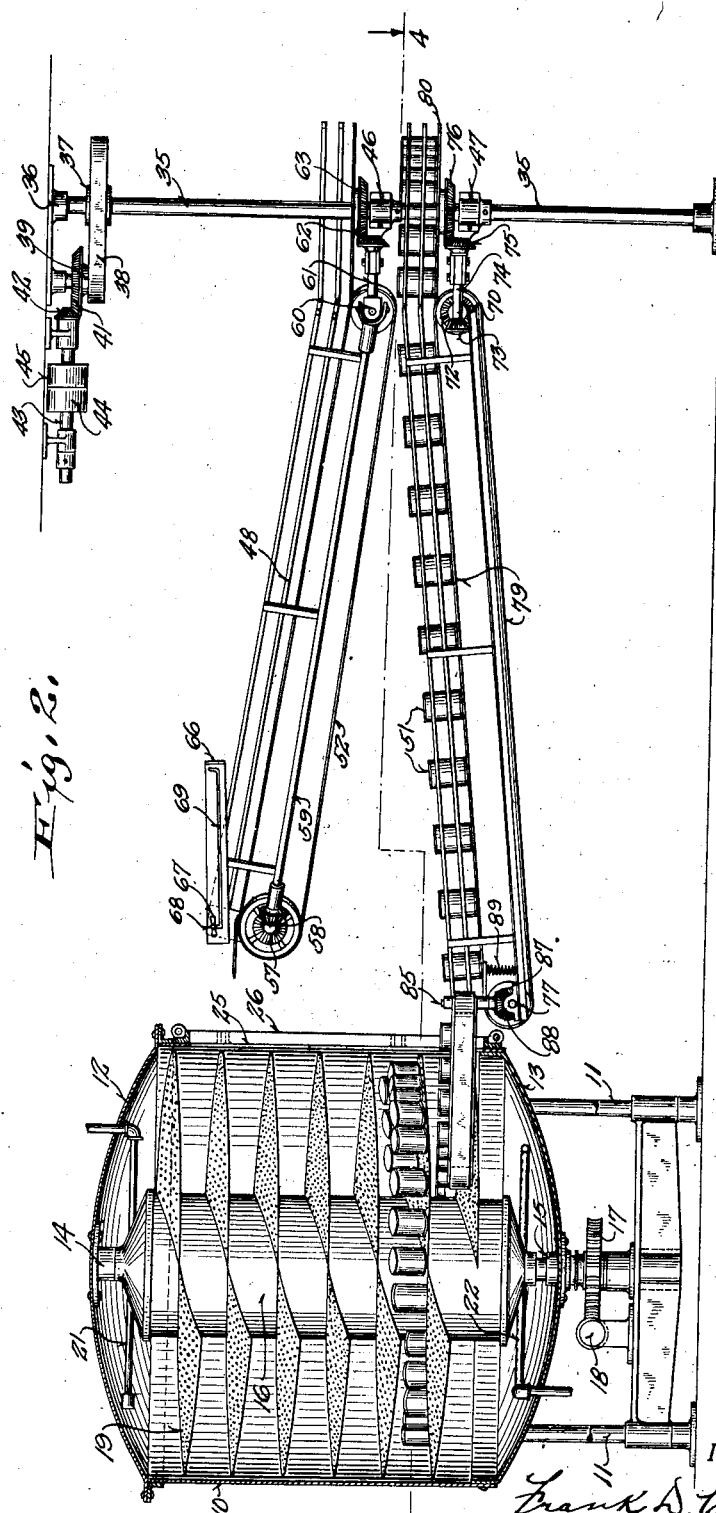

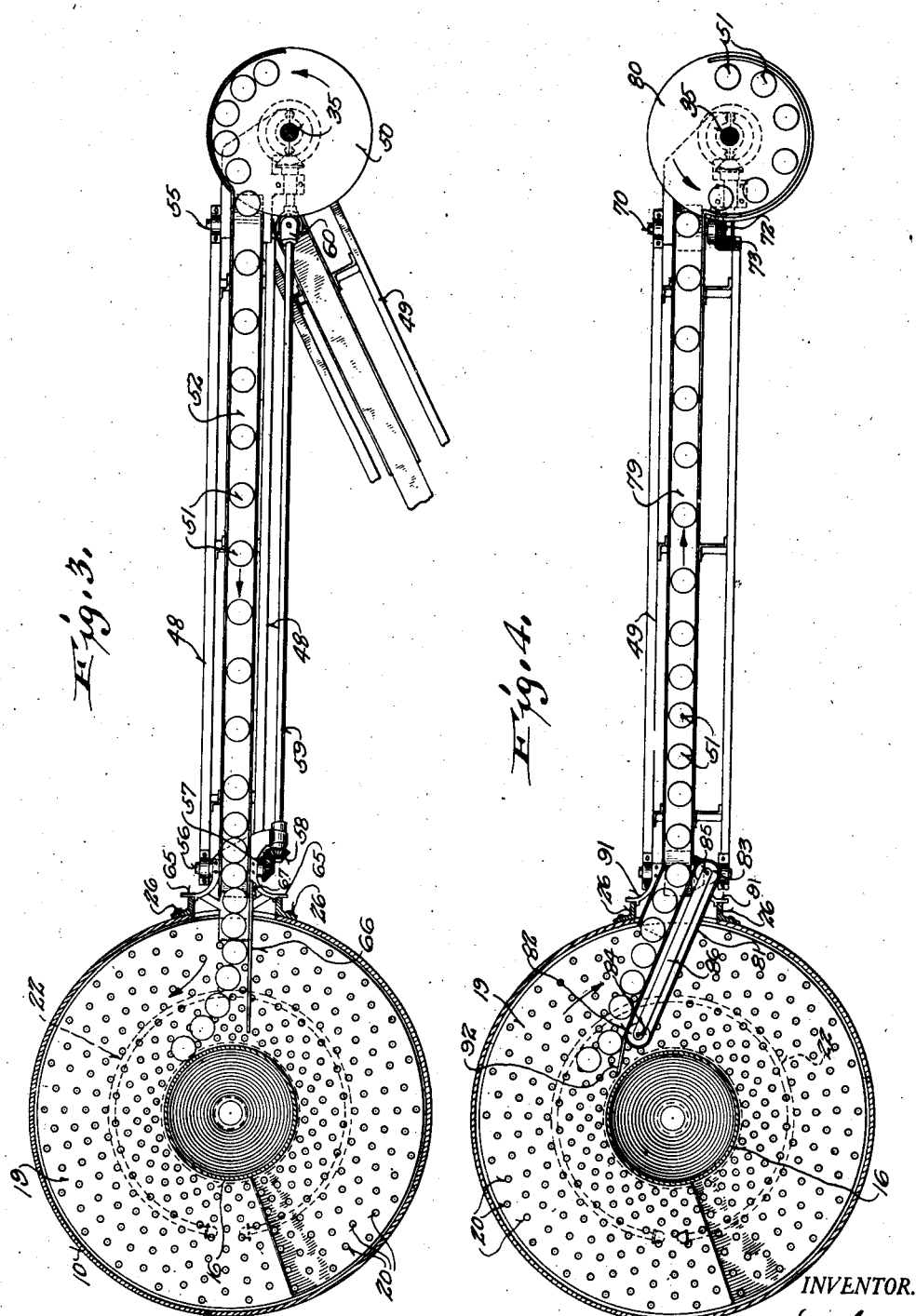

Patented Apr. 6, 1926.

1,579,517

UNITED STATES PATENT OFFICE.

FRANK D. CHAPMAN, OF BERLIN, WISCONSIN, ASSIGNOR TO BERLIN-CHAPMAN COMPANY, OF BERLIN, WISCONSIN, A CORPORATION OF WISCONSIN.

AUTOMATIC PROCESSING APPARATUS.

Application filed August 3, 1923. Serial No. 655,531.

*To all whom it may concern:*

Be it known that I, FRANK D. CHAPMAN, a citizen of the United States, and resident of Berlin, in the county of Green Lake and State of Wisconsin, have invented new and useful Improvements in Automatic Processing Apparatus, of which the following is a description, reference being had to the accompanying drawings, which are a part of this specification.

This invention relates to automatic processing apparatus, and has for one of its objects to provide an apparatus especially adapted for the cooking and sterilizing of food, commonly known as processing, after the same has been placed in metal cans or containers.

In the preparation of canned goods, it is customary to place the food within the metal containers commonly employed, which are then introduced into a closed chamber, where they are subjected to the action of relatively high temperatures produced by steam, hot water, or other suitable means, whereby the contents of the containers is sterilized and cooked to the desired degree. The carrying out of such a process has heretofore required more or less hand labor, and it is the primary object of the present invention to provide an apparatus which will reduce the number of attendants necessary, being substantially completely automatic in its operation.

A still further object of the invention is to provide an apparatus whereby the processing of the food may be carried on practically continuously.

A still further object of the invention is to provide an improved processing kettle or chamber in which the sterilization and cooking of the food may be carried on.

A still further object of the invention is to provide an apparatus which may be arranged in batteries, and which is provided with a common charging and discharging means which may be moved at will to charge and discharge the individual units of the battery.

With the above and other objects in view, which will appear as the description proceeds, the invention consists in the novel details of construction and combinations and arrangements of parts, more fully hereinafter disclosed and particularly pointed out in the appended claims.

Referring to the accompanying drawings in which like numerals designate like parts in all the views;

Figure 1 is a side elevational view, partly in section, of an apparatus constructed in accordance with the present invention, one of the processing kettles being shown in section with the charging apparatus in operative position relative thereto and the discharging apparatus in inoperative position;

Fig. 2 is a view similar to Fig. 1, the charging apparatus, however, being shown inoperative, while the discharging apparatus is illustrated in operative position;

Fig. 3 is a horizontal sectional plan view, taken approximately on the plane indicated by the line 3—3 of Fig. 1, looking down;

Fig. 4 is a view similar to Fig. 3, taken approximately on the plane indicated by the line 4—4 of Fig. 2, looking down;

Fig. 5 is an elevational view of one of the processing kettles;

Fig. 6 is a top plan view of the kettle shown in Fig. 5; and,

Fig. 7 is a diagrammatic plan view of a battery of the kettles, such as are illustrated in Figs. 5 and 6, showing the charging and discharging apparatus in operative positions relative to two of the units of the battery.

Referring more particularly to the said drawings, the numeral 10 indicates generally one of the processing kettles which may take the form of a hollow metal cylinder or drum, preferably arranged in vertical position upon a suitable stationary supporting frame 11. The upper and lower ends of the said drum 10 may be closed by the curved end plates, 12 and 13, respectively, which are provided with the axial bearings, 14 and 15, in which is rotatably mounted a spindle or shaft 16, which may be driven in any desired manner, as for example by means of the worm wheel 17 and the worm 18, arranged beneath the kettle or drum 10, upon the frame 11.

The spindle or shaft 16 has rigidly secured to it the spiral fin or shelf 19, which extends substantially from the upper to the lower end of the enlarged portion of the said spindle, as will be clear from Figs. 1 and 2, which fin or shelf is preferably provided with a plurality of holes or apertures 20, to facilitate the passage of the heating medium which may be introduced into the interior of the drum 10, as by the perforated pipes 21 and 22.

The vertical wall of the drum or cylinder 10 is provided at one point with an opening 25, extending substantially the full length of the drum, the edges of which opening may be reinforced by suitable bracing members, such as the angle irons 26, and the said opening may be closed when desired by means of a removable door or closure member 27, see Figs. 5 and 6, which may be retained in place by the hand nuts 28, threaded upon the pivoted bolts 29, which are adapted to pass between spaced ears 30 carried by the door member 27. The said door may be entirely removable, if desired, but is preferably hinged, as indicated at 31, to the wall of the kettle 10, adjacent the opening 25.

The structure thus far described comprises the kettle or chamber in which the cooking and sterilizing operation is carried on and, as above intimated, it is preferable to arrange a plurality of kettles in the form of a battery to the end that the kettles may be successively charged, operated, and discharged, thereby forming a substantially continuous process for cooking and sterilizing food. As diagrammatically illustrated in Fig. 7, the units of the battery are preferably arranged in the form of an arc of a circle, suitably spaced from one another, and in order to expeditiously and efficiently charge and discharge the various units, there is provided an apparatus which is pivotally mounted at the center of the arc so that it may be swung from one to another of the kettle units, as will now be described.

At the center of the said arc there is provided a vertical shaft 35, rotatably mounted in suitable bearings 36, and carrying a pulley 37, to which power may be supplied by means of a belt 38, passing around a pulley 39, carried by a counter-shaft 40, which also carries a bevelled gear 41, meshing with a bevelled pinion 42, carried by a second countershaft 43, provided with the tight and loose pulleys, 44 and 45, which may be driven from any suitable source of power not shown.

As will be best understood from Figs. 1 to 4, inclusive, the said shaft 35 passes through a pair of stationary brackets, 46 and 47, supported in any suitable manner, to which are pivotally secured respectively, the frames 48 and 49 of the charging and discharging apparatuses.

The charging apparatus comprises a plate or disc 50 rigid with the shaft 35, upon which the cans or containers 51 are initially placed, and associated with the said disc 50 in operative relation thereto, is an endless belt 52, which passes around the pulleys 53 and 54, the former of which is carried by a shaft 55 which may constitute the pivot between the charging frame 48 and its stationary bracket 46, as will be clear from Figs. 1 and 3.

The other pulley 54 is carried by a shaft 56, suitably journalled at the opposite end of the charging frame 48, which shaft also carries a bevelled gear 57, which meshes with a companion gear 58, carried by a longitudinally extending shaft 59, which is connected as by the universal joint 60 with the stub shaft 61, which carries a bevelled pinion 62 meshing with the bevelled gear 63, rigidly carried by the shaft 35.

The discharge end of the charging apparatus is preferably provided with a pair of guide members 65, adapted to engage the vertical angle reinforcing members 26, and in order to compensate for the vertical arcuate movement of this end of the charging apparatus, the said members preferably are made of resilient material, so that they will remain in engagement with the said angle members 26 throughout the vertical movement of the frame 48. The said discharge end is also provided with a longitudinally slidable guide member 66 which may be removably secured to the frame 48 by the wing nut 67 threaded upon a stud 68, which passes through the elongated slot 69 with which the said member 66 is provided.

The discharging apparatus is somewhat similar in construction to the charging apparatus just described, and as above mentioned comprises a suitable frame 49, which is hingedly connected as by the shaft 70, see Figs. 1, 2 and 4, to the stationary bracket 47. The said shaft 70 carries a pulley 71 and a bevelled gear 72, which gear meshes with a companion gear 73 carried by a stub shaft 74, which also carries at its other end a bevelled pinion 75 meshing with the bevelled gear 76, rigidly carried by the vertical shaft 35. At the other end of the frame 49 there is provided a transverse shaft 77, carrying a pulley 78, and an endless belt 79 passes around the said pulleys, 71 and 78, being driven by the former through the bevelled gear connections just described. A discharge disc or plate 80 is rigidly carried by the shaft 35 in co-operative relation to the right hand end of the belt 79 for receiving the cans or containers after the processing has been completed.

The receiving end of the discharge apparatus, which is adapted to be moved into receiving relation to the various kettles 10, is provided with an auxiliary collecting or feeding belt 81, see Figs. 1 and 4, which passes around the pulleys 82 and 83, carried by the vertically journalled shafts 84 and 130

85, respectively, mounted in the auxiliary frame 86. The shaft 85, as is best shown in Figs. 1 and 2, carries at its lower end a bevelled pinion 87, which meshes with a pinion gear 88, rigidly mounted on the shaft 77.

The said auxiliary frame 86, as well as the belt 81 and its associated parts, is adapted to pivot around the shaft 77 in order that these parts may be raised to insert them in and withdraw them from the interior of the kettle 10, and in order to normally maintain them in substantially the positions shown in the drawings, there is provided a suitable spring 89, which tends to keep the belt 81 and its associated parts in engagement with the spiral fin or shelf 19.

The receiving end of the discharge apparatus is also provided with the guide members 91, similar to the members 65, above described, and adapted to slidably engage the angle members 26, as will be readily understood. The auxiliary frame 86 is also provided with a guide plate 92, extending somewhat beyond the end of the auxiliary belt 81 to facilitate the guiding of the containers from the shelf 19 onto the receiving end of the discharge apparatus.

The operation of the device is as follows. In order to charge one of the kettles, its door or closure member 27 is opened, and the charging frame 48 is swung to a position with its discharge end in alignment with the opening 25, whereupon the slidable guide member 66 is introduced through the said opening above the fin or shelf 19, and secured in this position by tightening the wing nut 67. Power now being supplied to the shaft 35 through the various power connections described, the charging disc 50 will be rotated, as well as the pulleys 53 and 54, whereby the charging belt 52 will be continuously driven to receive the cans or containers 51, which will be placed upon the said disc 50. The said cans or containers will be fed by the said belt upon the fin or shelf 19 and the spindle or shaft 16, being now rotated in a counter-clockwise direction, as indicated by the arrow in Fig. 3, the said shelf will be filled with the cans 51 containing the food to be cooked, and sterilized.

As the rotation of the spindle 16 is continued, the charging apparatus will move downwardly, owing to the screw-threading action of the spiral fin, until the latter is completely charged with containers. When the charging apparatus reaches the lowest point of the fin 19, the feeding is stopped, the guide member 66 withdrawn, the door or closure member 27 of the kettle closed and the temperature of the interior of the kettle raised by means of steam, hot water, or other suitable heating medium introduced therein by means of the pipes 21 and 22.

During this charging operation the drum 16, together with its fin 19 will be continuously or intermittently rotated, while the charging apparatus is moved to the next kettle where the charging operation is repeated, and so on until all of the kettles of the battery have been charged.

When the cooking and sterilizing process has been completed, the heating may be stopped and the closure member 27 opened, whereupon the discharging apparatus may be swung into position, as shown in Figs. 2 and 4, whereupon power being supplied to the endless belt 79 and 81 and the discharge disc 80 from the shaft 35, the containers will be removed from the fin 19 along the belt 79 and disc 80, from which they may be taken and packed for shipment.

During the discharging operation the rotation of the spindle 16 and fin 19 is reversed, being now in a clockwise direction, as indicated by the arrow in Fig. 4, so that the discharging apparatus will be moved upwardly about its pivot 70, due to the screw-threading action of the spiral fin, until the last of the containers is removed from the uppermost portion of the said fin. The discharging apparatus may then be moved to the next kettle and the first kettle re-charged in the manner above disclosed.

It will thus be seen that a substantially continuous cycle of operation is provided, whereby the kettles may be substantially charged, subjected to the cooking process, and then discharged so that practically no time will be lost. Furthermore, with the exception of the manual movements of the charging and discharging apparatus the device is substantially completely automatic in its operation, thereby reducing the number of attendants necessary.

While one form of the invention has been illustrated and described it is obvious that those skilled in the art may vary the details of construction as well as the arrangement of parts without departing from the spirit of the invention, and therefore it is not wished to be limited to the above disclosure except as may be required by the accompanying claims.

What is claimed is:

1. A shell, and a spiral can support within said shell for receiving and holding said cans in indiscriminate order.

2. A shell, and a rotatable vertical spiral can support in said shell, the rotation of said spiral assisting the feeding and discharging of cans thereto and the cans being received in indiscriminate order.

3. A shell, a spiral can support in said shell, and means for rotating said support in either direction to charge or discharge cans to or from said shell in indiscriminate order.

4. A closed chamber, a perforated spiral can support rotatably mounted in said chamber, means for heating said chamber, and power means for rotating said support in either direction to charge or discharge cans to or from said shell in indiscriminate order.

5. In a food processing apparatus, a chamber, a vertical spiral can support rotatably mounted in said chamber, and automatic vertically moving means for feeding and discharging cans to and from said support.

6. In a food processing apparatus, a chamber; a spiral can support rotatably mounted in said chamber; and automatic vertically movable means for feeding and discharging cans to and from said support, said means being movable by engagement with said spiral.

7. In a food processing apparatus, a chamber provided with an opening; a spiral can support rotatably mounted in said chamber; means adapted to enter said opening and to engage said support, for feeding cans thereto, said means being vertically movable by said spiral; and independent vertically movable means also adapted to enter said opening and engage said spiral, for removing cans therefrom.

8. In a food processing apparatus, a plurality of heating chambers; a single means adapted to feed cans to all of said chambers; and a separate means adapted to remove said cans from all of said chambers.

9. In a food processing apparatus, a plurality of heating chambers arranged in an arc of a circle; and power means pivotally mounted at the center from which said arc is struck for feeding and removing cans to and from said chambers successively.

10. In a food processing apparatus, a plurality of heating chambers each provided with a rotatable spiral can support, said chambers being arranged in an arc of a circle; means for feeding cans to any of said chambers at will, pivotally mounted for horizontal movement at the center from which said arc is struck, said means being also vertically movable, by engagement with said spirals; and independent means for removing cans from any of said chambers at will, also pivoted for horizontal movement at said center, and also vertically movable by engagement with said spirals.

11. In a food processing apparatus, a plurality of heating chambers, a standard associated with said chambers and means pivoted to said standard for horizontal or vertical movement for depositing cans in or removing cans from said chambers successively.

12. In a food processing apparatus, a plurality of heating chambers arranged in an arc of a circle, a standard mounted at the center from which said arc is struck, and a plurality of endless belt conveyors pivoted to said standard for feeding cans to or removing cans from said chambers.

In testimony whereof I affix my signature.

FRANK D. CHAPMAN.